United States Patent
Dahneke

[11] 3,854,321
[45] Dec. 17, 1974

[54] AEROSOL BEAM DEVICE AND METHOD

[76] Inventor: Barton E. Dahneke, 89 Johnson Rd., Palmyra, N.Y. 14522

[22] Filed: Apr. 27, 1973

[21] Appl. No.: 355,047

[52] U.S. Cl. ............... 73/28, 73/432 PS, 250/573, 356/102
[51] Int. Cl. ..................... G01n 15/00, G01n 1/22
[58] Field of Search .......... 73/432 PS, 28; 356/102; 250/218, 573, 287; 209/139 R, 209/142, 143; 55/270

[56] References Cited
UNITED STATES PATENTS

| | | | |
|---|---|---|---|
| 2,932,394 | 4/1960 | McGinn | 73/432 PS X |
| 3,380,584 | 4/1968 | Fulwyler | 73/432 PS UX |
| 3,564,264 | 2/1971 | Karuhn et al. | 73/28 X |
| 3,653,253 | 4/1972 | Olin | 73/28 |
| 3,731,464 | 5/1973 | Brumbaugh et al. | 209/143 X |
| 3,739,180 | 6/1973 | Carlson | 73/432 PS X |

FOREIGN PATENTS OR APPLICATIONS 1,013,446  12/1955  Germany.................. 73/432 PS

OTHER PUBLICATIONS

Thomas, A. L., Jr. et al., A Portable Photometer and Particle Size Analyzer, In ISA Journal 8(7), pgs. 52–56, July 1961.

Primary Examiner—Richard C. Queisser
Assistant Examiner—Joseph W. Roskos
Attorney, Agent, or Firm—Tom Hiatt

[57] ABSTRACT

A device for generating focused aerosol beams is useful in the study, measurement and manipulation of airborne particles as well as in size sorting of industrial dusts and powders or pharmaceutical materials

AEROSOL BEAM DEVICE AND METHOD

FIELD OF INVENTION

This invention relates to aerosol beams and more particularly to processes and apparatus for manipulating and using such beams.

DESCRIPTION OF PRIOR ART

With the advent of increased concern for environment conservation, much attention has been focused on air pollution. In the case of massive clouds of black smoke pouring from an industrial smokestack, the fact of pollution is readily apparent. However, a complete understanding of the origins, nature and extent of air pollution requires capability to precisely count and measure large numbers of the small airborne particulates.

One common technique presently used for studying these particles is to direct a stream of airborne particulates through a focused light beam. The light scattered by the individual particulate is detected and measured. While useful for some applications, this procedure cannot detect particles below a certain size limit. Instruments using this procedure can measure only the relatively large particles ($\geq 0.5$ $\mu$m diameter) because of the absolute limit imposed by background scattering from surrounding gas molecules. Such instruments are also limited to measuring aerosols having a sufficiently low number density.

Several other methods for measuring airborne particulates are currently in use, all of which also have severe limitations. For counting extremely small particulates, condensation nuclei counters are used. Of course, these instruments count only the total number concentration and not size distribution. Moreover, such counters are very difficult to calibrate and may not detect small particles or droplets of non-wetting materials.

Automatic instruments for measuring the mobility of charged particles in an electric field are also used to obtain information about airborne particulates. However, these instruments are limited because, among other problems, techniques for giving the particulates a uniform charge are not yet developed. In addition to the above-mentioned automatic counting techniques, several "manual" techniques such as multi-stage impaction are in current use. These techniques are generally not as accurate and require extensive microscopic analysis and are, therefore, very time consuming and expensive. In order to fully determine the various properties of airborne particulates, a technique for accurately determining the size (or mass) distribution of such particulates is essential. Currently, no satisfactory technique exists for such accurate counting.

Methods for measuring the chemical composition and the compound size/composition distribution of airborne particulates are needed even more critically than those for measuring size distribution. Size (or mass) distribution data alone do not completely identify the origins, extent, toxicity, respirability of airborne particulates. Present techniques for measuring compound size/composition distributions typically require prohibitive amounts of laboratory analysis or do not provide adequate size/composition information.

A recent development known as an "aerosol beam" may be useful in overcoming some of the difficulties referred to above. The term "particulates" or more simply "particles" is used to refer to all types and sizes of solid and liquid matter and combinations thereof such as dust, powder, pollen, spores, viruses, bacteria, droplets and the like which are or can be suspended in a gas. The term "airborne particles" has reference to such particulates in a state of suspension in a gas. The term "aerosol" refers to both the airborne particles and the suspending gas. Briefly, an aerosol beam is generated when an aerosol is injected through a nozzle into a vacuum chamber where most of the gaseous portion of the aerosol is removed by continuous or periodic pumping while the relatively high momentum particles follow relatively straight line trajectories forming the beam. Aerosol beams thus are comprised of essentially isolated particles moving on straight line trajectories through the vacuum chamber, typically at velocities of about 300 m/sec.

Aerosol beams have been known since about 1964 when first described by Avy and Benarie in "Akustischer nachweis von staubteilchen," *Staub*, Vol, 24, p. 343 and by Murphy and Sears in "Production of particulate beams," *J. App. Phys.*, Vol. 35, p. 1986. Although aerosol beams have been known for several years, the unique properties of these beams have not been fully utilized. Various potential applications of these beams have been hindered by certain problems. For example, the small holes used to improve vacuum or collimate the beam become plugged whenever the beam contains a liquid fraction. Another major problem associated with the use of known aerosol beams is that a significant fraction of the airborne particles is lost as a result of impaction on the nozzle wall during flow of the aerosol into the vacuum chamber.

A still further problem with known aerosol beams of small sized particles is that those beams possess such large expansion angles as to be useless in many potential applications. Additionally, the particle velocity (for a given particle size) is not constant in the prior art aerosol beams. These latter difficulties arise in part from the fact that the velocity profile of a gas flowing through a nozzle, capillary or orifice is never constant over the entire cross section. The influence of the boundary layer is quite significant in the very small nozzles used in the generation of aerosol beams. Because of boundary layer influence, the maximum velocity is attained by those particles exiting in the beam center while the lowest velocity particles are those exiting near the nozzle wall. As the aerosol enters the vacuum chamber, the suspending gas rapidly expands in a radial manner within a finite solid angle. Particles located at increasing radii from the beam center are diverted in a radial direction by the radial expansion of the suspending gas. The resultant disadvantageous nonselective particle spreading is further compounded by the lower forward velocity of the outer beam particles as described above.

For optimum use of aerosol beams, these enumerated difficulties must be overcome. Accordingly, there is a need for a means or process for minimizing the solid angle described by an aerosol beam and for obtaining an essentially constant particle velocity for a given particle size.

SUMMARY OF THE INVENTION

I have found a technique for focusing aerosol beams such that the solid angle describing the beam is minimized and the particle velocity for a given particle size is essentially constant. The resultant focused beam is extremely useful in conjunction with semiautomated and automated counting, measuring and size sorting techniques. The present invention is especially useful in counting of aerosols having a high number density i.e., a large number of particles per unit volume of aerosol. The counting of such dense aerosols often requires accurate dilution to extremely high dilution ratios, and the present technique readily provides the necessary controlled dilution. In addition to generating geometrically and velocity focused beams as mentioned above, there is no particle loss due to impaction on the nozzle walls.

DESCRIPTION OF PREFERRED EMBODIMENTS

The objects and advantages of this invention are accomplished in part by an aerosol beam focuser comprising a means for directing a stream of aerosol through an aperture into a vacuum chamber and means for surrounding that stream with a flow (moving in the same general direction as the stream) of substantially particle-free gas as the stream passes through the orifice and into the vacuum chamber. In another embodiment, the aerosol beam focusing device generally comprising a means for directing a flow of clean, dry gas into a vacuum chamber and means for directing an aerosol into the center of said flow prior to the gas entering the vacuum chamber.

As used hereinafter the term "aerosol" has reference to a two-phase mixture comprised of a continuous gaseous phase having suspended therein a discontinuous phase comprised of particles. The term "particles" as used hereinafter, and as alluded to above, has reference to solid particulate matter, liquid droplets including such droplets in their frozen state, or mixtures of these as described previously.

Figure 1:
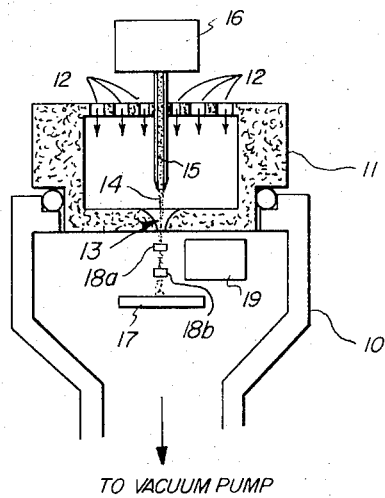
FIG. 1 is a sectional view of a representative embodiment of the present invention.

Referring now to FIG. 1, there is shown vacuum chamber 10 which is maintained at reduced pressures by a vacuum pump not shown. Affixed to vacuum chamber 10 is a flow chamber 11 having at least one inlet port 12 and having an exit nozzle 13 leading to vacuum chamber 10. Chambers 10 and 11 can be in the form of one integral piece or in the form of separable pieces as shown, for example, in FIG. 1 wherein chambers 10 and 11 are fitted together in an air tight manner by clamps or threaded fittings. An O-ring prevents unwanted air from entering chamber 10. In a particularly useful embodiment, flow chamber 11 has a plurality of inlet ports 12 which allow gas to enter in a relatively uniform manner. The shape of the individual ports 12 is not critical nor is the shape of exit nozzle 13. However, because complexly shaped inlets 12 or nozzle 13 typically are more difficult to manufacture, inlets 12 and nozzle 13 are generally circular holes. Inlets 12 can be replaced or supplemented by a layer of filter material so as to smooth and clean the gas flow into chamber 11. In the embodiment of FIG. 1, nozzle 13 is also tapered to create a smooth gas flow. In a preferred embodiment, the flow of gas in chamber 11 is laminar. The shape of flow chamber 11 can vary widely; however, for laminar flow the shape should be such as to minimize and preferably eliminate any swirling. From the standpoint of reproducibility, a preferred shape is one which provides laminar flow throughout chamber 11 and well into nozzle 13. Of course, the present invention will also work, in principle, with turbulent flow as well, provided the resultant turbulent mixing is not too great. Because the design and manufacturing considerations are simpler with laminar, such flow is preferred.

The gas used in accordance with this invention can be essentially any dry, clean gas. The term "clean," as used in connection with the gas, means filtered or substantially particle-free. Dry, filtered air is readily available and is thus a preferred gas. The air or other gas is supplied to flow chamber 11 through inlet ports 12 and exits chamber 11 through nozzle 13. The pressure of the gas can vary widely. However, the upstream pressure ($P_u$), i.e. the pressure in flow chamber 11, can be more or less than atmospheric but should be significantly greater than the downstream pressure ($P_d$), i.e. the pressure on the downstream side of nozzle 13 inside vacuum chamber 10. Typically, in the generation of aerosol beams of aerosols at essentially atmospheric pressure, the pressure in the vacuum chamber is substantially lower than one-half atmosphere and preferably is less than about one-half Torr. A wide range of downstream to upstream pressure ratios ($P_d/P_u$) can be used. However, the preferred maximum ratio used for a given gas is that which will produce sonic flow at the nozzle exit or at the minimum cross-sectional area in the nozzle. "Sonic flow" is a term applied to a gas which is expanded until it is moving at the speed of sound for the conditions of the gas in the nozzle. The critical maximum value of $P_d/P_u$ which will give rise to sonic flow is defined by the formula $$P_d/P_u = [2/(k+1)]^{k/(k-1)}$$

wherein $k$ is the ratio of the specific heat of the gas used at constant pressure ($C_p$) to the specific heat of the gas at constant volume ($C_v$). For air the value of $k$ or $C_p/C_v$ is 1.40; therefore, the critical $P_d/P_u$ ratio is 0.528. This value, of course, will vary depending upon the particular gas used.

Associated with flow chamber 11 is a means for directing an aerosol stream 14 into chamber 11, through nozzle 13 and into vacuum chamber 10. As seen in FIG. 1, this aerosol directing means 15 can be in the form of a capillary or other device having a small orifice. Aerosol directing means 15 is located in close proximity to nozzle 13 and is positioned substantially along the longitudinal axis of nozzle 13 so as to direct an aerosol stream containing particles 14 into the approximate center of the gas flow prior to the gas entering vacuum chamber 10. The aerosol is supplied to directing means 15 by an aerosol source 16. The size of the orifice leading from means 15 is generally smaller than that of the entrance of nozzle 13 such that the aerosol emerging from means 15 comprises up to only about 50 percent of the cross-sectional area of the gas flow in the nozzle. Thus, in the case of a circular orifice in means 15 and a circular nozzle 13, the diameter of the aerosol stream entering in the center of nozzle 13 would comprise up to only about 70 percent of the diameter of the nozzle entrance. In the embodiment shown in FIG. 1, a very small flow of aerosol, about 1 cc./min., injected near the entrance to nozzle 13 and into the center of a laminar flow of dry, clean air flowing at about 1,390 cc./min. results in the aerosol particles being entrained only in approximately the central 0.1 percent of the air jet. The aerosol stream can comprise a larger portion of the flow through nozzle 13. However, once the relative sizes are such that the aerosol stream extends substantially into the boundary layer flow region of the gas, the advantages of this invention are diminished. As indicated above, means 15 can be a capillary tube. Additionally, means 15 can be merely a small (e.g., about 0.1 to 0.4 mm.) orifice in a particle-stopping wall against which an aerosol flows. This particle-stopping wall can be in the form of a filter means which allows the gaseous portion of the aerosol to pass but stops the particles which can pass only through the described orifice. In this latter situation, the gaseous portion of the aerosol and the substantial particle-free gas are the same. Whatever the configuration, means 15 is located close to nozzle 13 in order to insure that the aerosol enters and travels along the approximate longitudinal axis of nozzle 13 without nearing or contacting the walls thereof.

The pressure of the aerosol and the pressure of the particle-free gas can be varied. When generating aerosol beams of atmospheric particles at or near sea level, the aerosol pressure can be essentially atmospheric. The aerosol pressure also can be substantially less than atmospheric, for example, when the pressure of source 16 is suitably controlled as by pumping. The aerosol pressure and the pressure of the diluting gas are adjusted relative to each other to control the relative flow rates of aerosol to diluting gas. The term "diluting gas" is used hereinafter to refer to the gas entering through inlet ports 12 as distinguished from the gaseous phase of the aerosol itself. Of course, the relative flow rates of aerosol to diluting gas will vary depending upon the size of the equipment used and the desired application. Typical ratios of aerosol to diluting gas-flow rates range from about 1:1 to 1:1,500 or greater with the higher ratios being preferred in that they result in more sharply focused aerosol beams having smaller solid angles and containing particles (of any given size) moving at a more uniform velocity. High dilution ratios also facilitate automatic counting of high density aerosols.

Figure 2:
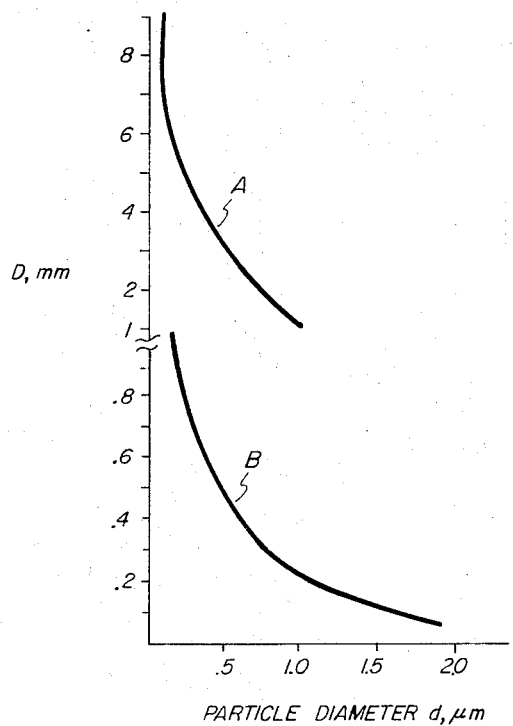
FIG. 2 is a graph of particle size versus particle deposit diameter.

The curves of FIG. 2 were obtained with the aid of a target 17 placed inside vacuum chamber 10 and in the path of the aerosol beam. The target 17 was separated 10 mm. from the exit of nozzle 13. The diameter, D, of the deposit on target 17 resulting from each aerosol beam was measured. Two curves were generated. Curve A represents a prior-art aerosol beam wherein there was no diluting gas and the aerosol flow through nozzle 13 comprised the total flow. The flow rate was 1,390 cc./min. Curve B represents a focused aerosol according to the invention, wherein the aerosol flow is 28 cc./min. and the total flow (aerosol plus diluting gas) through nozzle 13 was 1,390 cc./min.

Unlike prior-art aerosol beam techniques, the present invention is suitable for use with aerosols of high moisture content. Condensation of water droplets in nozzle 13 or in the free jet immediately downstream of (the exit of) nozzle 13 is prevented by the high dilution of the aerosol with, for example, clean dry air in flow chamber 11. This dilution results in an immediate lowering of the relative humidity. Thus, spurious signals caused by unwanted water droplets are not significant. Additionally, the desired aerosol particles (i.e., liquid droplets, moist particles, biological materials, as well as dry particles) are substantially cooled in the adiabatically expanding gas stream. For example, measurements of polystyrene latex spheres of 1.3 $\mu$m diameter and of 2.0 $\mu$m diameter poly(vinyltoluene) spheres show cooling of about 30° to 35° C. in the expanding gas. As a result of this cooling, undesirable evaporation of the very particles to be measured is greatly retarded. Calculations of the evaporation loss from small water droplets show that less than 10 percent of the droplet mass is lost during flight in the vacuum chamber. This small loss is equivalent to less than a 3 percent reduction of the particle diameter. The evaporation loss can be even further reduced by cooling the diluting gas before and during passage through flow chamber 11. Conversely, of course, should the need arise, for example to further improve focusing, the diluting gas can also be heated prior to and during the passage through chamber 11.

As mentioned previously, in prior light scattering systems of detecting or counting airborne particles, background scattering from surrounding gas molecules imposed a lower limit on the size of detectable single particles. However, for particles in a vacuum there is, in principle, no lower detection limit. Thus, by passing an aerosol beam through a focused light beam and detecting the scattered light, extremely small particles can be counted. Additionally, the aerosol beams of the present invention can be passed through two (or more) light beams 18a and 18b (FIG. 3) spaced apart a known, fixed distance and emanating from a source not shown. Scattered light resulting from aerosol particles passing through two (or more) light beams 18a and 18b is detected by photodetector 19 which can be a photomultiplier. The sets of two (or more) signals from the photodetector 19 can be fed to a multichannel analyzer not shown or otherwise electronically processed. From this information the number of particles can be determined by the number of signal sets and the terminal velocity can be determined from the time of flight between beams 18a and 18b. From the terminal velocity (or higher order derivatives of the particle velocity), the aerodynamic size can be determined. This latter technique can be thought of as the aerodynamic analog of mass spectrometry procedures in which ions are distinguished by their different times of flight.

The term "aerodynamic size" refers to the size of a unit mass density sphere which will follow the same trajectory and/or obtain the same velocity as the particle in question. Aerodynamic size thus provides a means of characterizing a particle, with several unknown properties, in terms of a single size parameter which is usually close to the actual size.

Figure 3:
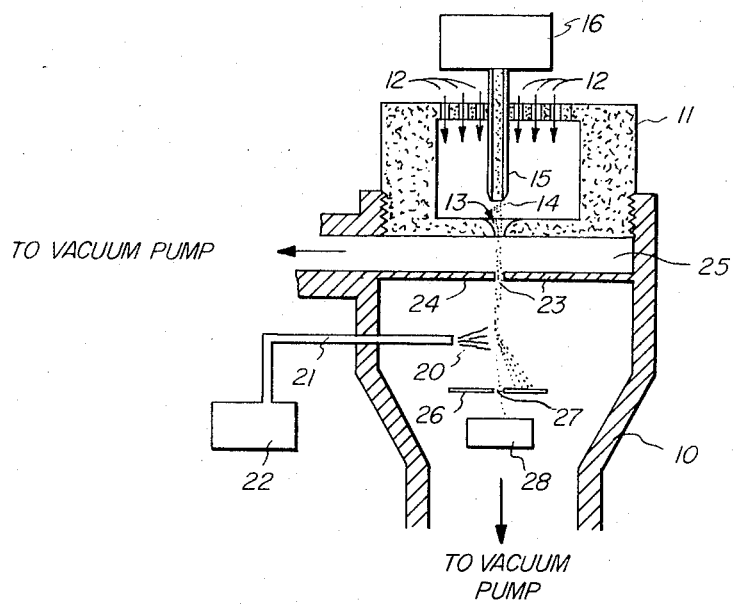
FIG. 3 is a sectional view of another embodiment of this invention.

In a further embodiment of this invention, the focused aerosol beam is selectively spread or deflected by a sideward gas stream impinging upon the beam. Referring to FIG. 3, after the aerosol beam passes through nozzle 13, jet 21 directs a sideward gas stream 20 from source 22 into and across the path of the aerosol beam. The stream of gas from jet 21 preferably is substantially perpendicular to said aerosol beam and imparts a sideward velocity component to the particles in the beam, with the smaller particles obtaining a greater sideward velocity component. Thus, the aerosol beam is spread into different trajectories according to the size and density of the particles in the beam. This spreading is the aerodynamic analogue of mass spectrometry techniques where a continuous beam of sample ions is deflected by a transverse field with the magnitude of deflection depending upon the charge-to-mass ratio.

Typically, when two supersonic gas streams collide an oblique shock results which tends to diffusely deflect small particles. Accordingly, for optimum reproducibility and for coherence of deflected beams of small particles it is preferred that the focused aerosol beam be "clean," that is, substantially free from gas molecules, except for the dilute background gas in the vacuum chamber 10, prior to intersecting with the stream of gas from jet 21. The aerosol beam can be cleaned by passing it through one or a series of pinholes 23 which causes further diffusion of the gaseous portion of the beam, thereby lowering the gas molecule population within the aerosol beam. A simple method of accomplishing this result is to reduce the vacuum in stages as shown in FIG. 3. Wall 24 defining pinhole orifice 23 also defines a first vacuum chamber 25 in which the pressure is lowered with one vacuum pump, not shown. After traveling through chamber 25, the aerosol beam exits through orifice 23 into a second vacuum chamber 10 having an even lower pressure. This enhances removal of gas molecules remaining in the aerosol beam. Of course, this procedure can be repeated in additional stages. Such additional stages can result in extremely low pressures, thus removing even more of the gas molecules and thereby further reducing unwanted background scattering of light as mentioned previously. Typically orifice 23 is just slightly larger than the diameter of the beam at that point so that the particles pass undeterred.

The clean aerosol beam is then deflected by the gas stream emerging from jet 21 as described above. Selected size subranges can be separated out by means of adjustable collimating means 26 having slit 27 through which only particles having a preselected trajectory will pass. The desired subrange of particles can then be collected in container 28. Container 28 can be cryogenically cooled to prevent evaporation and typically is sealed after a sufficient sample is collected. An exemplary means of determining the composition of the collected particles is to heat the sealed container to vaporize the particles. The resultant vapor is then analyzed by mass spectrometry, for example. Such a technique, when used in conjunction with the various counting procedures described above, provides for the first time a means for automatically counting the compound particle size/chemical distribution of an aerosol. Using analogous procedures, the present invention can also be used to count automatically the particle size/radioactivity or other distributions.

With a known flow rate of a given gas from jet 21, the deflection of the aerosol beam can be calculated as a function of aerodynamic size of the particles. By adjusting the flow rate from jet 21, the resolution in the size separating power of the instrument for different particle size ranges can be optimized. Although virtually any gas can be used to provide the sideward gas stream, for a given pressure or flow rate different gases will cause different degrees of deflection of the aerosol beam. This difference in deflection is a function of the molecular weight of the particular gas used. Air is among the preferred gases simply because it is readily available.

Figure 4:
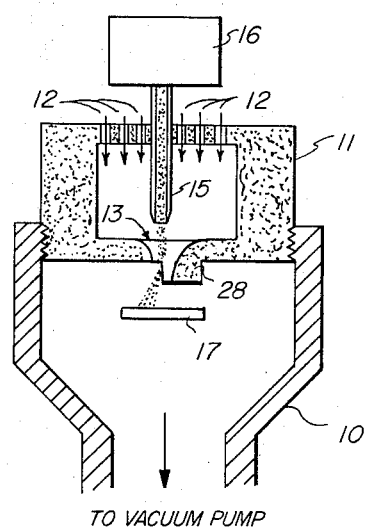
FIG. 4 is a sectional view of a further embodiment of this invention.

Similar to the spreading by the stream of gas emanating from jet 21, spreading can also be accomplished by the unsymmetrical expansion of the aerosol. In this latter embodiment of the invention, nozzle 13 is unsymmetrical as seen in FIG. 4. In this particular configuration, an approximately 180° section of the circumferential wall defining nozzle 13 extends into vacuum chamber 10 further than the remaining portion of the wall. This extended portion or flange 28 partially restricts expansion of the aerosol. However, as there is no similar restriction on the opposite side of nozzle 13, the gaseous portion of the aerosol, immediately upon entering vacuum chamber 10, expands away from flange 28 and across the beam thus diverting the particles and resulting in controlled spreading of the beam. The embodiment shown in FIG. 4 is merely representative of a suitable unsymmetrical configuration for nozzle 13. Any of a variety of nozzle shapes which produce unsymmetrical expansion about the nozzle axis are useful in this invention.

Figure 5:
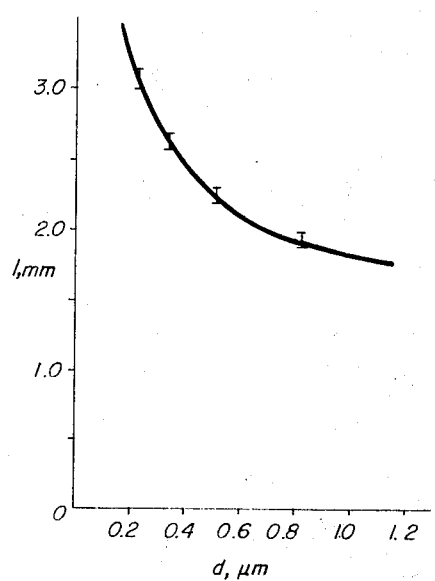
FIG. 5 is a graph of particle diameter versus deflection.

By using a device as in FIG. 4 in which the aerosol expansion is constrained by flange 28 around one half of the circumference of nozzle 13, an unsymmetrical expansion of mono-dispersed latex aerosols was obtained. Using an aerosol flow rate of 1 cc/min and a total flow (aerosol plus diluting gas) of 1,390 cc/min, several such aerosols were injected and the different sized particles were collected on a coated glass target 10 mm from the nozzle exit. Each size particle formed a distinct well separated deposit. FIG. 5 shows the measured values of deflection, 1, from the nozzle axis for the various sized latex spheres having aerodynmaic diameter, $d$. The deposit lengths $\Delta 1$ are indicated by the vertical lines.

Spreading of the present focused beams can also be accomplished by transverse electric or magnetic fields. Whatever means used to spread, the beams must be focused simply because an unfocused beam cannot be meaningfully spread in that particles of a given size are not traveling at a uniform velocity nor are th particles restricted to a sufficiently small neighborhood. Attempts to collimate an unfocused beam prior to spreading typically are not workable because a large number of particles are lost and/or any liquid fraction plugs up the collimating hole. Thus, aerosol beams focused in accordance with this invention provide new capabilities in studying aerosols.

In addition to the study and measurement of airborne particles, the present invention, as mentioned previously, is useful in size sorting of various materials. For example, industrial dusts and powders or pharmaceutical materials can be size sorted using this invention. Typically, size sorting is accomplished by spreading a focused aerosol beam using any of the techniques described above. One or more containers are appropriately placed in the vacuum chamber so as to collect particles of a predetermined size or trajectory.

As mentioned previously, the shape of nozzle 13 can vary. If particle size spreading is not desired or is to be accomplished by sideward gas streams, then nozzle 13 is typically symmetrical. Nozzle 13 can be short and relatively blunt or it can be long and tapered. If the nozzle is short and blunt a greater separation results in the velocity of different sized particles; whereas, a long tapered nozzle tends to compress the velocity differential. Of course, nozzle variations between and in addition to these two extremes also can be used in this invention.

The invention has been described in detail with particular reference to certain preferred embodiments thereof, but it will be understood that variations and modifications can be effected within the spirit and scope of the invention.

I claim:

1. A device for detecting airborne particles comprising:
   a. means for directing a stream of an aerosol, comprised of a continuous gaseous phase and a discontinuous phase of said particles, through an aperture and into a vacuum chamber whereby the gaseous phase expands away from said particles thereby forming an aerosol beam and
   b. means for measuring the times of flight of said particles over at least one portion of their trajectory.

2. A device as described in claim 1 wherein said means for measuring comprises:
   a. means for directing said aerosol beam through at least two spaced light beams whereby the particles comprising said aerosol beam scatter said light,
   b. means for detecting said scattered light and generating a signal in response thereto, and
   c. means for analyzing said signals to determine the number thereof and the times of flight of said particles.

3. A device as described in claim 1 wherein said device includes a means for surrounding said aerosol stream with a concurrent flow of substantially particle-free gas as the aerosol stream passes through said aperture.

4. A device as described in claim 3 having associated therewith a means for deflecting portions of said aerosol beam into different trajectories.

5. A device as described in claim 4 wherein said vacuum chamber has associated therewith means for collecting portions of said beam having a preselected trajectory.

6. A device as described in claim 3 wherein said vacuum chamber has associated therewith an adjustable collimating means which allows only portions of said beam having a preselected trajectory to pass.

7. A device as described in claim 3 wherein a sonic flow of said particle-free gas is generated in said aperture by said means for surrounding the aerosol stream.

8. A device for detecting airborne particles comprising:
   a. means for directing a stream of an aerosol, comprised of a continuous gaseous phase and a discontinuous phase of said particles, through an aperture and into a vacuum chamber whereby the gaseous phase expands away from said particles thereby forming an aerosol beam and
   b. means for measuring the velocities of said particles over at least one portion of their trajectory.

9. A method for determining information about airborne particles comprising the steps of:
   a. directing a stream of aerosol, comprised of a continuous gaseous phase and a discontinuous phase of said particles, through an aperture and into a vacuum chamber in which the gaseous phase expands from said particles to form an aerosol beam and
   b. measuring the time of flight of said particles over at least a portion of their trajectory.

10. The method as described in claim 7 wherein said measuring is accomplished by:
    a. directing said aerosol beam through at least two spaced light beams to cause scattering of the light by said particles comprising the aerosol beam,
    b. detecting the resultant scattered light and generating an electronic signal in response thereto, and
    c. analyzing said signals to determine the number thereof and the times of flight of said particles through said light beams.

11. The method as described in claim 10 wherein said beam of aerosol is surrounded by a concurrent, sonic flow of substantially particle-free gas as said stream passes through said orifice.

12. In an aerosol beam-generating device comprising means for directing a stream of aerosol, comprised of a continuous gaseous phase and a discontinuous phase of particles, through an aperture and into a vacuum chamber whereby the gaseous phase expands away from said particles, the improvement wherein said device includes:
    a. means for surrounding said aerosol stream with a concurrent sonic flow of substantially particle-free gas as the aerosol stream passes through said aperture whereby a focused aerosol beam is generated,
    b. means for directing said focused beam through at least two spaced light beams whereby said particles scatter said light, and
    c. means for detecting the resultant scattered light.

13. A device as described in claim 12 wherein said vacuum chamber has associated therewith a means for directing a gas stream into the path of the aerosol beam whereby portions of said focused aerosol beam are deflected into different trajectories.

14. A device as described in claim 12 including means for providing unsymmetrical expansion of said gaseous phase.

15. A device as described in claim 12 wherein said particle-free gas and said gaseous phase are comprised of the same gas.

16. In an aerosol beam-generating device comprising means for directing a stream of aerosol, comprised of a continuous gaseous phase and a discontinuous phase of particles, through an aperture and into a vacuum chamber whereby the gaseous phase expands away from said particles, the improvement wherein said device includes:
    a. means for surrounding said aerosol stream with a concurrent sonic flow of substantially particle-free gas as the aerosol stream passes through said aperture whereby a focused aerosol beam is generated, and
    b. means for deflecting portions of said focused aerosol beam into different trajectories.

* * * * *